March 14, 1972     W. C. ROSS     3,649,439

PRINTING ELEMENT

Filed Sept. 25, 1968

Patented Mar. 14, 1972

3,649,439
PRINTING ELEMENT
William C. Ross, Winchester, Mass., assignor to W. R. Grace & Co., Cambridge, Mass.
Continuation-in-part of application Ser. No. 541,258, Apr. 8, 1966. This application Sept. 25, 1968, Ser. No. 768,604
Int. Cl. B32b 27/08, 27/40
U.S. Cl. 161—165                                                                7 Claims

ABSTRACT OF THE DISCLOSURE

A product suitable for use as a top sheet for printing presses having a base layer of a dimensionally stable, flexible, polymeric sheet substance (e.g. polyethylene terephthalate) and a working surface of an elastomeric substance having a modulus of at least 420 p.s.i. at 300% elongation (e.g. polyurethane). A resilient, compressible backing (e.g. a porous elastomer-impregnated, felted fibrous sheet) can be adhesively secured to the base layer to absorb vibration occurring in the printing operation.

---

This application is a continuation-in-part of application Ser. No. 541,258, filed Apr. 8, 1966, now abandoned.

This invention relates to top sheets for platen and rotary letter presses. Such sheets are also known as draw sheets, or tympans.

Ideally, the surface which presses the paper against the raised type faces in letter press printing should be able to distort sufficiently to make a uniform impression despite micro-inaccuracies in the height of the type or in the gauge of the paper, but it should recover immediately, and suffer no permanent deformation.

Conventionally, draw sheets have been made from carefully calendered flexible material and most usually from high-grade Abaca paper which is spread and tightly drawn over the packing which covers either the platen or the impression cylinder of the press. One of the major difficulties with prior materials has been embossing, i.e., after repeated impressions, the draw sheet is permanently embossed or hammered around the individual type faces. The impression made in the draw sheet gradually worsens as the press run continues. Although many draw sheets last throughout the scheduled run of the printing press before the degree of embossing seriously interferes with the quality of printing, it is the usual experience that draw sheets, after a printing run, will have been embossed to such a degree that they cannot be used for another form. If this is done, the embossed areas do not print, or print in a broken manner. The outlines of the type which previously embossed the draw sheet show in the new impression. Because the replacement of draw sheets and the make-ready time which such replacement makes necessary is a costly operation, there has been an insistent demand for draw sheets that can be used repeatedly.

In rotary printing, as the impression cylinder turns against the plate cylinder, a compressional wave travels along the draw sheet. In the usual draw sheet, the effect of repeated impressions is that the material becomes displaced and compressed. I have found that if the draw sheet comprises at least two layers, one comprising a flexible base sheet having high dimensional stability and sufficiently high tensile strength to withstand stretching and the pull of the take-up reel, and if the other layer, i.e., the working surface, be a firmly adherent layer of a distortably polymeric substance having a high modulus and quick recovery, superior printing impressions which require a minimum of make-ready will be produced. Also the service life of the draw sheet, and particularly its stability to be reused on other and different type, is surprisingly bettered. The thickness of the surface layer appears to be material. Due to the great difference in printing press set-up practices and the considerable differences in the actual rolling pressure employed by various pressmen, the limits are hard to define, but a thick, distortable layer, saiy 0.020 of an inch will, under ordinary conditions, permit a noticeable wave which has the effect of slurring or comma-ing the impression left by a high-light dot, whereas the impression left by draw sheets when the layer is in the order of 0.003 to 0.020 of an inch ordinarily will show no spreading of the ink beyond substantially the actual dimensions of the dot.

Suitable materials for use as the inextensible base in the present invention are dimensionally stable, flexible, polymeric sheet substances having a tensile strength at normal temperatures of at least 23,000 p.s.i. Of materials which have sufficient dimensional stability and the required tensile strength to withstand the pull, I have found that polyethylene terephthalate is outstanding. Accordingly, I prefer this substance as the inextensible base. The thickness of the inextensible base will generally be in the range of about 0.003 to 0.010 of an inch.

Of elastomeric materials that bond well to the base and possess the high modulus and quick recovery necessary to form the working surface, I have found that fully reacted polyurethanes which have a Durometer-A hardness of 65 and above, tensile strengths of at least 5,000 p.s.i., and a modulus (p.s.i.) at 300% of 420, preferably greater than 950, are outstanding. Hydroxy terminated, completely reacted thermoplastic polyester polyurethanes having a Durometer-A hardness, tensile strength and modulus in the aforementioned ranges are especially preferred.

Accordingly, my improved draw sheet comprises a laminated structure having a base lamination of polyethylene terephthalate preferably approximately .005 of an inch in thickness, and a uniformly adherent surface coating of a polyurethane also having a thickness preferably in the order of .005 of an inch. The characteristics which give these two substances, i.e., polyethylene terephthalate and polyurethane, utility, are physical, not chemical. Other polymers possessing the same physical characteristics are equally suitable. As explained, because of the variations in press practice, some variation in thickness of both laminations is permissible, but thicknesses within the ranges aforementioned appear to cover the great majority of conditions encountered in the printing industry.

In a particularly preferred embodiment of the invention, a backing of a suitable resilient, compressible material is adhesively secured to the inextensible, polymeric base. Thus, such a preferred embodiment comprises in sequence; a working surface layer of the elastomeric substance, an intermediate layer of the inextensible, polymeric base and a layer of resilient, compressible backing. Such a backing functions as a vibration absorber permitting smooth operation of the rotary printing press at relatively higher speeds. Further, absorbing vibration by the use of the resilient, compressible backing enhances the quality of the printing obtained. The thickness of the backing can be about 0.020 to 0.050, and preferably is about 0.022 to 0.026 of an inch as measured using a Vandercook plate gauge at 200 p.s.i.

Illustrative of the materials which can be used as the resilient, compressible backing in his preferred embodiment are cellular rubber materials such as foamed or sponge rubber, microporous rubber, etc.; porous, impregnated fibrous sheet materials, e.g., impregnated non-woven fibrous materials such as are prepared from felted wood, cotton or artificial fibers impregnated with rubber; and other materials having the requisite characteristics of resiliency and compressibility. The term "rubber" includes natural rubber as well as synthetic rubbery polymers such as butyl rubber, polyurethane rubber, styrene-butadiene rubber, acrylonitrile rubber, and other elastomeric substances. Suitable adhesives for bonding the resilient, compressible backing to the inextensible base will be evident to those skilled in the art.

The preferred resilient, compressible material for use as a backing in this particularly preferred embodiment of the invention is described in my U.S. Pat. 3,147,698. Such a material comprises a highly porous felted fibrous sheet impregnated with an elastomeric material. Such sheets can be prepared by impregnating, for example, mercerized cotton linters paper with rubber latex. Particularly preferred are sheets prepared according to the teachings of the aforementioned patent having a firmness such that a pressure of at least about 10 pounds per square inch must be exerted on the sheet to effect an initial compression of 2 mils, and a residual porosity at 4 mils compression of at least about 37 percent. If desired, an additional ply of a nonextensible material, e.g., a ply of fabric or a ply of the above described inextensible, polymeric base material can be suitably adhered to the underside of the resilient, compressible backing to further enhance the dimensional stability of the multi-ply top sheet.

The invention may be best understood by reference to the figures in which

Figure 1:
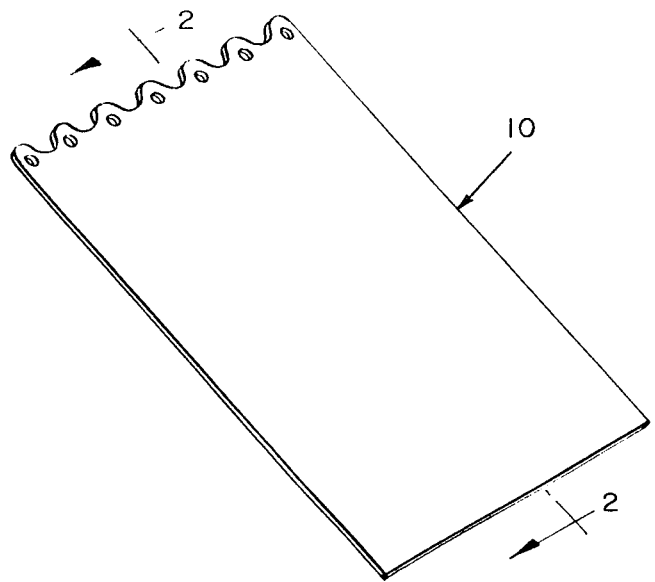
FIG. 1 is a top perspective view of a draw sheet.
Figure 2:
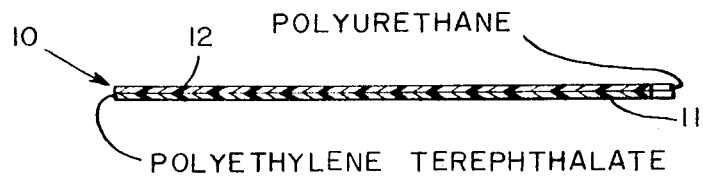
FIG. 2 is a section through the draw sheet on the line 2—2 of FIG. 1.

Specifically, the base lamination, 11, of the draw sheet, 10, is composed of polyethylene terephthalate. Generally, its thickness is in the order of .005 of an inch. The top lamination, 12, which forms the outer surface of the draw sheet, consists of polyurethane. In the figures, this material (while in solution in an approriate solvent, e.g., methyl ethyl ketone) is spread over lamination, 11, by a conventional knife spreader. The thickness of lamination 12, also is generally in the order of .005 of an inch. After coating the base sheet with the polyurethane solution, the coating is allowed to dry thoroughly. It is permanently adherent to the polyester base.

While the preferred embodiment employs a polyurethane layer cast from a solution, the polyurethane is also suitably employed in the form of a laminated unsupported film. In still another embodiment, the urethane prepolymer and active hydrogen containing compound are applied to the base and the polymer is formed in situ by the application of heat. As example of other suitable solvents for the polyurethane, mention may be made of dimethyl formamide and tetrahydrofurane.

EXAMPLE I

The sheet of polyethylene terephthalate (Mylar Type A, Gauge 500), was coated with the following composition:

|   | Parts by weight |
|---|---|
| Polyurethane (Estane 5740X2) Goodrich Chemical Company | 20 |
| Solution A | 80 |

Composition of Solution A

|   |   |
|---|---|
| Methyl ethyl ketone | 67.5 |
| Dimethyl formamide | 30.0 |
| Alcohol | 2.5 |

This solution was spread on the Mylar sheet in two passes through a knife coater. Subsequent to coating the material was carefully dried at temperatures beginnnig at room temperature, raised gradually to 135° F. When dry, the coating was .005 of an inch thick and was self-adherent to the Mylar base.

EXAMPLE II

A sheet of polyethylene terephthalate (Myalr Type A, Gauge 500) was coated with the following composition:

|   | Parts by weight |
|---|---|
| Polyurethane (Estane 5740X70) | 20 |
| Dimethyl formamide | 80 |

The above solution was coated on the Mylar sheet in two passes of the knife coater to give a final thickness of polyurethane, after drying, of .005 of an inch thick. The sheet was dried slowly during a period of five hours, during which time the temperature was raised gradually from room temperature to 150° F., a temperature which was maintained for the last hour.

EXAMPLE III

A resilient, compressible backing was prepared by impregnating a mercerized cotton linter paper of 121 ream weight and having a density of 3.9 with a butadiene-acrylonitrile copolymer latex to which had been added a melamine resin in an amount of 20 parts by weight of melamine resin per 100 parts of butadiene-acrylonitrile copolymer solids. The total solids of the impregnating composition was 34.5 percent. The excess of latex compound was squeezed out of the sheet, leaving an amount of impregnant solids equivalent to 83 percent of the weight of the fiber, of which 12.5 percent was melamine resin, 62.2 percent was the copolymer and the remaining 8.3 percent was made up of stabilizers, antioxidants and heat sensitive coagulant. The impregnated sheet was then dried, lightly calendered to bring it to a uniform thickness and heated to a temperature of 300° F. for a period of four minutes in order to effect partial cure of the copolymer-resin mixture. A 15 percent solids ethyl alcohol solution of an uncured epoxy resin composition (50 parts of epoxy resin of the diglycidyl ether type to 50 parts of a polyamide resin containing available amino groups as the curing agent) was spread on the top surface of the impregnated sheet by means of a doctor blade, and was allowed to penetrate the sheet completely. The solvent was then removed. The compressible backing thus prepared was adhered to the uncoated Mylar surface of the composite draw sheet prepared in Example I using a modified vinyl adhesive (Angiers SRC 1987–2).

Draw sheets made according to Examples I and II were subjected to a series of tests reported bolw. The same results were reported with respect to both sheets with the exception being that in the drop tests, the number of drops required to produce a slight impression in the sheet of Example II rose from 20 to 25.

Test 1.—The draw sheet of Example I was placed in a Vandercook Proof Press, and an electrotype, including both type matter and a 100-screen half-tone, was laid on the patent base. The impression cylinder was set down to a squeeze setting which previously had been found to cause serious embossing of an Abaca draw sheet after 5 or 6 passes of the press. The same squeeze setting was maintained when the sheet of Example I was used. A close examination of the draw sheet, after the same number of impressions had been pulled on the Vandercook machine, showed that the sheet had withstood the squeeze impression. No evidence of embossing or any distortion of the surface was visible. The electrotype was then changed and new proofs were pulled. No sign of the first impression appeared on the proofs.

Test 2.—Sheets manufactured according to Examples I and II were placed on a Hoe magazine press, and run against an electrotype containing both type matter and a half-tone of 100-screen. Standard make-ready practice was followed. After a run of 125,000 impressions, the run was stopped and a new electrotype was substituted. The draw sheet previously used for 125,000 impressions was then pulled over the impression cylinder, and a new print run commenced. After 2,000 impressions, the electrotype was again changed, and thereafter small runs with changed electros were repeated until five jobs and a total of 400,000 impressions had been printed. At this time, only 7 characters in the last form showed any evidence of embossing.

Test 2A.—A draw sheet manufactured in accordance with Example I was placed on a Hoe magazine press and run under commercial condition. The run lasted 480,000 impressions and included three different jobs. The sheet showed no evidence of embossing at the time of its removal. The impressions printed subsequent to the changes in the type form showed no evidence whatever of embossing or any loss in definition of any of the areas in the printed image until approximately 480,000 impressions had been run. Comparing the printed forms with the same forms when run against an Abaca draw sheet, reproduction was superior. There was noticeably less spreading of the ink, especially on the high-light dots, and improved contrast in the high-light areas.

Test 3.—Draw sheets manufactured in accord with Examples I and II are laid over a sheet of press packing material which is supported by an iron anvil. A 1-lb. weight having a cylindrical projection 0.420 inch in diameter is suspended in a guide tube one foot above the draw sheet. The weight is allowed to fall freely through the guide tube. The test is a series of impacts. In the case of manilla draw sheets, the weight is allowed to fall once, and the impression is examined. The draw sheet is moved and the weight is allowed to impact on the new area twice, and so on until the distortion is so great as to render the draw-sheet unusable. In the case of the improved draw sheet, the first test is one drop at the first location, 5 drops at the second, 10 at the third, etc., in increments of five drops, until an impression is clearly visible. At the end of the test the sheet is removed from the anvil and visually examined for impression. This can best be done by examining the back of the sheet, holding the sheet at a low angle to the eyes.

In the case of a manilla draw sheet, the sheet is actually thinned, as measurements in the table below show. In the case of the improved draw sheet, no thinning is noticeable; instead, the material, while maintaining the same thickness, is displaced, or "drawn." The depth of depression after the recorded number of drops was visually given as follows:

TABLE 1

| Manilla draw sheet | | Mylar alone | | |
|---|---|---|---|---|
| Number of impacts | Thickness loss, mil. | Thickness gauge | Number of impacts | Distortion |
| 1 | 6/10 | 5 | 5 | Definite. |
| 2 | 1 | 7½ | 5 | Do. |
| 5 | 1 3/10 | 10 | 5 | Do. |
| 10 | 1 7/10 | | | |

TABLE 2.—COMPOSITE DRAW SHEET

| | Impression | |
|---|---|---|
| | Example I | Example II |
| Number of impacts: | | |
| 1 | None | None. |
| 5 | do | Do. |
| 10 | do | Do. |
| 15 | do | Do. |
| 20 | Slight | Do. |
| 25 | Light embossing | Slight. |

When presses are operated at usual packing pressures, this combination of dimensional stability and instant recovery of the surface after the impression pressure is relaxed, results in a draw sheet which not only produces a superior printed image initially, but retains its superior performance despite type changes for long periods and throughout extended press runs. The high degree of adhesion of the coating to the base also contributes to this result, for even in runs of a half-million impressions, no ply separation has resulted either from the rolling pressure of a rotary press or the direct pressure of presses of the platen type.

I claim:

1. A product suitable for use as a draw sheet for letter presses comprising a layer of vibration-absorbing, resilient, compressible backing material, an intermediate layer of polyethylene terephthalate having a tensile strength of at least 23,000 p.s.i., and a working surface of a layer of polyurethane having a modulus of at least 420 p.s.i. at 300% elongation and a thickness of between 0.003 and 0.020 of an inch.

2. The product of claim 1 wherein the modulus at 300% elongation of said polyurethane is greater than 950.

3. The product as defined in claim 1 wherein said base has a thickness of substantially 5 mils, the thickness of said polyurethane layer being approximately .005 of an inch.

4. The product of claim 1 wherein said compressible backing material comprises a porous, impregnated, fibrous sheet.

5. The product of claim 4 wherein said sheet is prepared from a felted vbrous material impregnated with an elastomeric substance.

6. A product suitable for use as a draw sheet for letter-presses comprising a layer of a porous felted, fibrous sheet material impregnated with an elastomeric substance, an intermediate layer of polyethylene terephthalate having a tensile strength at normal temperatures of at least 23,000 p.s.i. and having a thickness of about 0.003 to 0.010 of an inch, and, as a working surface, a layer of a polyurethane having a modulus of at least 402 p.s.i. at 300% elongation and a thickness of about 0.003 to 0.020 of an inch.

7. The product of claim 6 wherein said polyurethane is a hydroxy terminated, fully reacted thermoplastic polyester polyurethane.

References Cited

UNITED STATES PATENTS

| 2,402,706 | 6/1946 | Sprigg | 101—415.1 |
| 2,673,826 | 3/1954 | Ness | 154—139 |
| 2,741,297 | 4/1956 | Vamvaketis | 154—54 |
| 2,779,684 | 1/1957 | Alles | 117—138.8 X |
| 2,955,961 | 10/1960 | Koller | 117—138.8 |
| 3,067,482 | 12/1962 | Hollowell | 117—138.8 X |
| 3,136,614 | 6/1964 | Kuzmick | 117—138.8 X |
| 3,147,698 | 9/1964 | Ross | 161—250 X |

FOREIGN PATENTS

| 636,007 | 2/1962 | Canada | 161—190 |
| 662,449 | 4/1963 | Canada | 161—190 |

WILLIAM D. MARTIN, Primary Examiner

H. J. GWINNELL, Assistant Examiner

U.S. Cl. X.R.

117—138.8 F, 161 KP; 161—190, 231